United States Patent
Mei et al.

(10) Patent No.: US 12,238,032 B2
(45) Date of Patent: Feb. 25, 2025

(54) ACQUISITION OF QUASI-CO-LOCATION INFORMATION USING TRANSMISSION CONFIGURATION INDICATORS

(71) Applicant: ZTE CORPORATION, Guangdong (CN)

(72) Inventors: Meng Mei, Shenzhen (CN); Chuangxin Jiang, Shenzhen (CN); Zhaohua Lu, Shenzhen (CN); Bo Gao, Shenzhen (CN); Shujuan Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 301 days.

(21) Appl. No.: 18/088,109

(22) Filed: Dec. 23, 2022

(65) Prior Publication Data

US 2023/0131134 A1    Apr. 27, 2023

Related U.S. Application Data

(63) Continuation of application No. PCT/CN2020/119407, filed on Sep. 30, 2020.

(51) Int. Cl.
*H04L 5/00*    (2006.01)
(52) U.S. Cl.
CPC ................ *H04L 5/0051* (2013.01)
(58) Field of Classification Search
None
See application file for complete search history.

(56) References Cited

U.S. PATENT DOCUMENTS

| | | | |
|---|---|---|---|
| 2019/0230545 A1* | 7/2019 | Liou | H04W 24/10 |
| 2020/0145159 A1 | 5/2020 | Tsai et al. | |
| 2020/0145983 A1* | 5/2020 | Levitsky | H04L 5/005 |
| 2021/0337572 A1 | 10/2021 | Ji et al. | |

FOREIGN PATENT DOCUMENTS

| | | |
|---|---|---|
| CN | 110391890 A | 10/2019 |
| CN | 110475263   | 11/2019 |
| CN | 111106913 A | 5/2020 |
| CN | 111147211 A | 5/2020 |
| CN | 111226414 A | 6/2020 |
| CN | 111436129 A | 7/2020 |

(Continued)

OTHER PUBLICATIONS

ERICSSON: "Beam management without beam indication" 3GPP TSG-RAN WG1 #91; R1-1720722; Dec. 1, 2017; Reno, USA (3 pages).

(Continued)

*Primary Examiner* — Diane L Lo
(74) *Attorney, Agent, or Firm* — Foley & Lardner LLP

(57) ABSTRACT

Presented are systems, methods, apparatuses, or computer-readable media for acquisition of quasi-co-location information using transmission configuration indicators. A wireless communication device may receive an indication of a plurality of transmission configuration indicator (TCI) states, from a wireless communication node. The wireless communication device may acquire all configured quasi co-located (QCL) information of a first set of TCI states from the plurality of TCI state. The wireless communication device may acquire a partial portion or no portion of configured QCL information of the second set of TCI states from the plurality of TCI states.

12 Claims, 9 Drawing Sheets

(56) References Cited

FOREIGN PATENT DOCUMENTS

| WO | WO-2019/195171 A1 | 10/2019 |
| WO | WO-2020/086572 A1 | 4/2020 |
| WO | WO-2020/144637 A1 | 7/2020 |

OTHER PUBLICATIONS

International Search Report and Written Opinion for PCT Appl. No. PCT/CN2020/119407, mailed Jun. 30, 2021 (9 pages).
First Office Action for CN Appl. No. 202310378330.3, dated Jan. 15, 2024 (with English translation, 14 pages).
OPPO., "Text Proposal for QCL" 3GPP TSG RAN WG1 Meeting #92bis, R1-1804004, Apr. 20, 2018, Sanya, China (8 pages).
Second Office Action for CN Appl. No. 202310378330.3, dated Mar. 4, 2024 (with English translation, 7 pages).
First IN Exam Report on IN Appln No. 202227075199, dated Jan. 19, 2024 (6 pages).
Apple Inc., "On Further MIMO Enhancement", 3GPP TSG RAN WG1 #100b, R1-2004234, Jun. 5, 2020, e-Meeting (10 pages).
Asia Pacific Telecom, "Discussion on Enhancements for Multi-beam Operation", 3GPP TSG RAN WG1 #102-e, R1-2006636, Aug. 28, 2020, e-Meeting (5 pages).
CATT, "Discussion on enhancements on HST-SFN deployment", 3GPP TSG RAN WG1 #102-e, R1-2005687, Aug. 28, 2020, e-Meeting (8 pages).
CMCC, "Enhancements on HST-SFN deployment", 3GPP TSG RAN WG1 #102-e, R1-2006204, Aug. 28, 2020, e-Meeting (11 pages).
Ericsson, "High Level Views on Rel-17 feMIMO", 3GPP TSG-RAN WG1 Meeting #101-e Tdoc, R1-2004633, Jun. 5, 2020, e-Meeting (15 pages).
Futurewei, "Enhancement to support HST-SFN deployment scenario", 3GPP TSG RAN WG1 #102-e, R1-2005592, Aug. 28, 2020, e-Meeting (5 pages).
Huawei et al., "Enhancements on Multi-TRP for high speed train in Rel-17", 3GPP TSG RAN WG1 Meeting #102-e, R1-2006394, Aug. 28, 2020, e-Meeting (4 pages).
Intel Corporation, "On HST SFN enhancements", 3GPP TSG RAN WG1 Meeting #102-e, R1-2005862, Aug. 28, 2020, e-Meeting (9 pages).
Interdigital Inc., "Enhanced M-TRP for HST-SFN", 3GPP TSG RAN WG1 #102-e, R1-2005486, Aug. 28, 2020, e-Meeting (8 pages).
Nokia et al., "Enhancements for HST-SFN deployment", 3GPP TSG RAN WG1 #102-e Meeting, R1-2006847, Aug. 28, 2020, e-Meeting (8 pages).
Nokia et al., "Enhancements to enable inter-cell multi-TRP operations", 3GPP TSG RAN WG1 #102e, R1-2006845, Aug. 28, 2020, e-Meeting (7 pages).
Oppo, "Enhancements on HST-SFN deployment", 3GPP TSG RAN WG1 #102e, R1-2005987, Aug. 28, 2020, e-Meeting (3 pages).
Qualcomm Incorporated, "Enhancements on HST-SFN deployment", 3GPP TSG-RAN WG1 Meeting #102-e, R1-2006794, Aug. 28, 2020, e-Meeting (15 pages).
Sony, "Considerations on HST-SFN operation for multi-TRP", 3GPP TSG RAN WG1#102e, R1-2005564, Aug. 28, 2020, e-Meeting (3 pages).
VIVO, "Evaluation and discussion on HST-SFN schemes", 3GPP TSG RAN WG1 #102-e, R1-2005367, Aug. 28, 2020, e-Meeting (10 pages).
CATT: "Discussion on enhancements on HST-SFN deployment", 3GPP TSG RAN WG1 #102-e, R1-2005687, e-Meeting, Aug. 8, 2020 (8 pages).
Extended EP Search Report on EP Appl No. 20955691.9, dated Jun. 20, 2023 (12 pages).
Huawei et al., "Enhancements on Multi-TRP for high speed train in Rel-17", 3GPP TSG RAN WG1 Meeting #1-2e, R1-2006394, e-Meeting, Aug. 8, 2020 (4 pages).

* cited by examiner

ACQUISITION OF QUASI-CO-LOCATION INFORMATION USING TRANSMISSION CONFIGURATION INDICATORS

CROSS-REFERENCE TO RELATED APPLICATION

This application claims the benefit of priority under 35 U.S.C. § 120 as a continuation of PCT Patent Application No. PCT/CN2020/119407, filed on Sep. 30, 2020, the disclosure of which is incorporated herein by reference in its entirety.

TECHNICAL FIELD

The disclosure relates generally to wireless communications, including but not limited to systems and methods for acquisition of quasi-co-location (QCL) information using transmission configuration indicators (TCIs).

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, a method, an apparatus, or a computer-readable medium. A wireless communication device may receive an indication of a plurality of transmission configuration indicator (TCI) states, from a wireless communication node. The wireless communication device may acquire all configured quasi co-located (QCL) information of a first set of TCI states from the plurality of TCI state. The wireless communication device may acquire a partial portion or no portion of configured QCL information of a second set of TCI states from the plurality of TCI states.

In some embodiments, the partial portion may include one or more remaining QCL parameter after removing {Doppler Shift} from all configured QCL parameters in each TCI state of the second set of TCI states. In some embodiments, the partial portion may include one or more remaining QCL parameter after removing {Doppler Shift, Doppler Spread} from all configured QCL parameters in each TCI state of the second set of TCI states.

In some embodiments, for QCL Type A information included in each TCI state of the second set of TCI states, the partial portion may include {Doppler Spread, Average Delay, Delay Spread}. In some embodiments, for QCL Type A information included in each TCI state of the second set of TCI states, the partial portion may include {Average Delay, Delay Spread}.

In some embodiments, for QCL Type C information included in each TCI state of the second set of TCI states, the partial portion may include {Average Delay}. In some embodiments, for QCL Type B information included in each TCI state of the second set of TCI states, the partial portion may include {Doppler Spread}. In some embodiments, the first set of TCI states may include a first TCI state, and the second set of TCI states may include a second TCI state.

In some embodiments, the wireless communication device may determine to acquire all the configured QCL information from the first set of TCI states, and the partial portion of the configured QCL information from the second set of TCI states, according to a location of the wireless communication device. In some embodiments, a QCL type in the second set of TCI states, for frequency range 1 (FR1) may include QCL type A or QCL type C In some embodiments, the wireless communication device may determine that a partial portion of configured QCL parameters of each TCI state of the second set of TCI states should not be used as a reference, when a transmission scheme is configured for single frequency network (SFN). In some embodiments, the wireless communication device may determine all the configured QCL information from the first set of TCI states, and the partial portion of configured QCL information from the second set of TCI states, according to antenna port indication of a demodulation reference signal (DMRS).

In some embodiments, the wireless communication device may determine all the configured QCL information from the first set of TCI states, and the partial portion of configured QCL information from the second indicated set of TCI states, according to a DMRS code division multiplexing (CDM) group index. In some embodiments, the wireless communication device may receive, via higher layer signaling, an indication that a transmission scheme is for single frequency network (SFN) in which only a partial portion of the configured QCL information of the second set of TCI states is acquired.

At least one aspect is directed to a system, a method, an apparatus, or a computer-readable medium. A wireless communication node may transmit an indication of a plurality of transmission configuration indicator (TCI) states to a wireless communication device. The wireless communication node may cause the wireless communication device to acquire all configured quasi co-located (QCL) information of a first set of TCI states from the plurality of TCI states. The wireless communication node may cause the wireless communication device to acquire a partial portion or no portion of configured QCL information of a second set of TCI states from the plurality of TCI states.

In some embodiments, the partial portion may include one or more remaining QCL parameter after removing {Doppler Shift} from all configured QCL parameters in each TCI state of the second set of TCI states. In some embodiments, the partial portion may include one or more remaining QCL parameter after removing {Doppler Shift, Doppler Spread} from all configured QCL parameters in each TCI state of the second set of TCI states.

In some embodiments, for QCL Type A information included in each TCI state of the second set of TCI states, the partial portion may include {Doppler Spread, Average Delay, Delay Spread}. In some embodiments, for QCL Type A information included in each TCI state of the second set of TCI states, the partial portion may include {Average Delay, Delay Spread}.

In some embodiments, for QCL Type C information included in each TCI state of the second set of TCI states, the partial portion may include {Average Delay}. In some embodiments, for QCL Type B information included in each TCI state of the second set of TCI states, the partial portion may include {Doppler Spread}. In some embodiments, the first set of TCI states may include a first TCI state, and the second set of TCI states may include a second TCI state.

In some embodiments, the wireless communication node may cause the wireless communication device to determine to acquire all the configured QCL information from the first set of TCI states, and the partial portion of the configured QCL information from the second set of TCI states, according to a location of the wireless communication device. In some embodiments, a QCL type in the second set of TCI states, for frequency range 1 (FR1) may include QCL type A or QCL type C In some embodiments, the wireless communication node may cause the wireless communication device to determine that a partial portion of configured QCL parameters of each TCI state of the second set of TCI states should not be used as a reference, when a transmission scheme is configured for single frequency network (SFN). In some embodiments, the wireless communication node may cause the wireless communication device to determine all the configured QCL information from the first set of TCI states, and the partial portion of configured QCL information from the second set of TCI states, according to antenna port indication of a demodulation reference signal (DMRS).

In some embodiments, the wireless communication node may cause the wireless communication device to determine all the configured QCL information from the first set of TCI states, and the partial portion of configured QCL information from the second indicated set of TCI states, according to a DMRS code division multiplexing (CDM) group index. In some embodiments, the wireless communication node may transmit, to the wireless communication device via higher layer signaling, an indication that a transmission scheme is for single frequency network (SFN) in which only a partial portion of the configured QCL information of the second set of TCI states is acquired.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

The following acronyms are used throughout the present disclosure:

| Acronym | Full Name |
| --- | --- |
| 3GPP | 3rd Generation Partnership Project |
| 5G | 5th Generation Mobile Networks |
| 5G-AN | 5G Access Network |

-continued

| Acronym | Full Name |
| --- | --- |
| 5G gNB | Next Generation NodeB |
| BWP | Bandwidth Part |
| CCE | Control Channel Element |
| CDM | Code-Division Multiplexing |
| CE | Control Element |
| CN | Core Network |
| CSI-RS | Channel State Information, Reference Signal |
| DCI | Downlink Control Information |
| DMRS | Demodulation Reference Signal |
| DL | Down Link or Downlink |
| HST | High-Speed Train |
| MAC | Media Access Control |
| NG | Next Generation |
| NW | Network |
| OFDM | Orthogonal Frequency-Division Multiplexing |
| OFDMA | Orthogonal Frequency-Division Multiple Access |
| PDCCH | Physical Downlink Control Channel |
| PDCP | Packet Data Convergence Protocol |
| PDSCH | Physical Downlink Shared Channel |
| PHY | Physical Layer |
| PUCCH | Physical Uplink Control Channel |
| QCL | Quasi-Co-Location |
| RA | Random Access |
| RLC | Radio Link Control |
| RNTI | Radio Network Temporary Identifier |
| RS | Reference Signal |
| RRC | Radio Resource Control |
| SFN | Single Frequency Network |
| TB | Transport Block |
| TCI | Transmission Configuration Indicator |
| TRP | Transmission/Reception Point |
| TRS | Tracking Reference Signal |
| UE | User Equipment |
| UL | Up Link or Uplink |

1. Mobile Communication Technology and Environment

Figure 1:
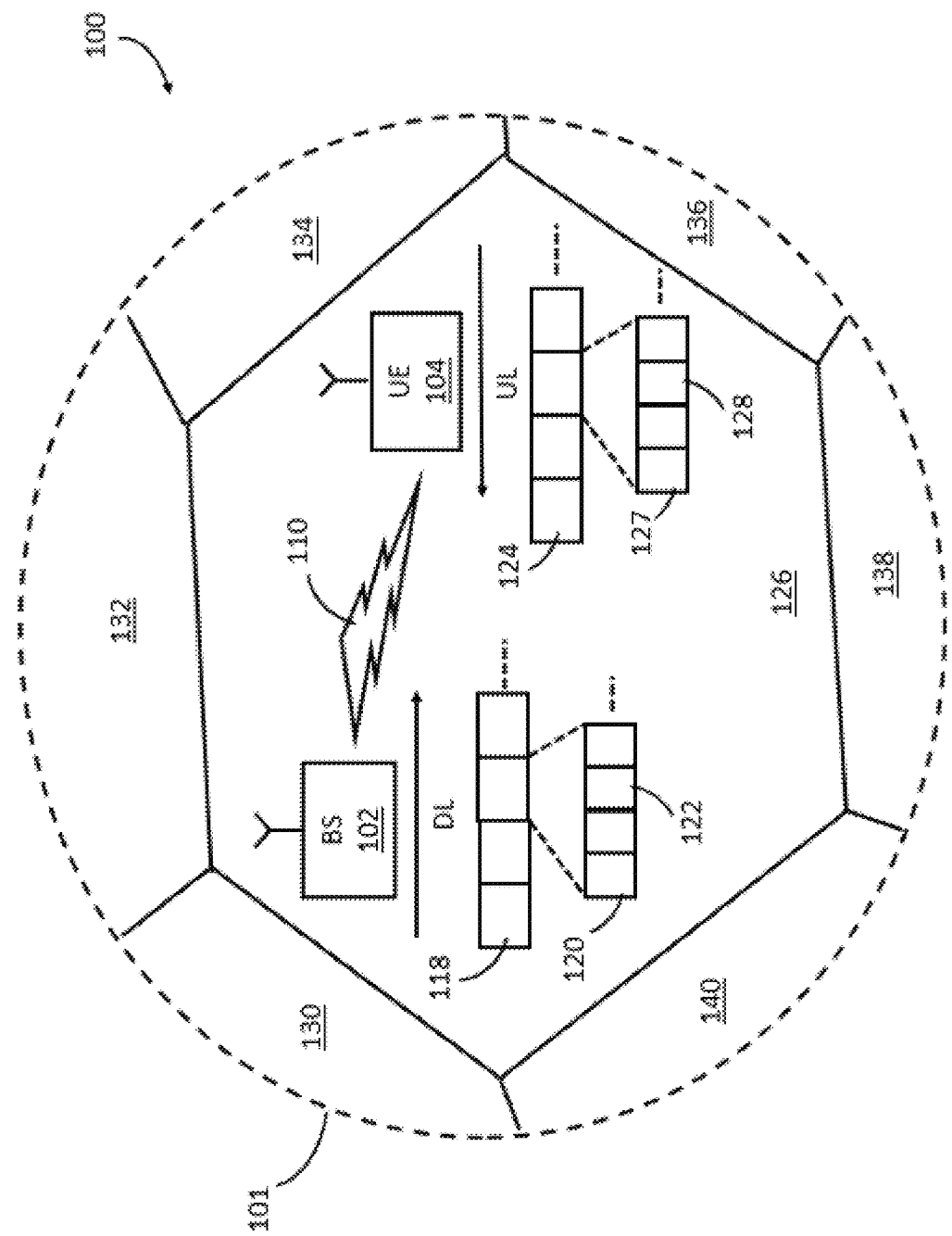
FIG. 1 illustrates an example cellular communication network in which techniques disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
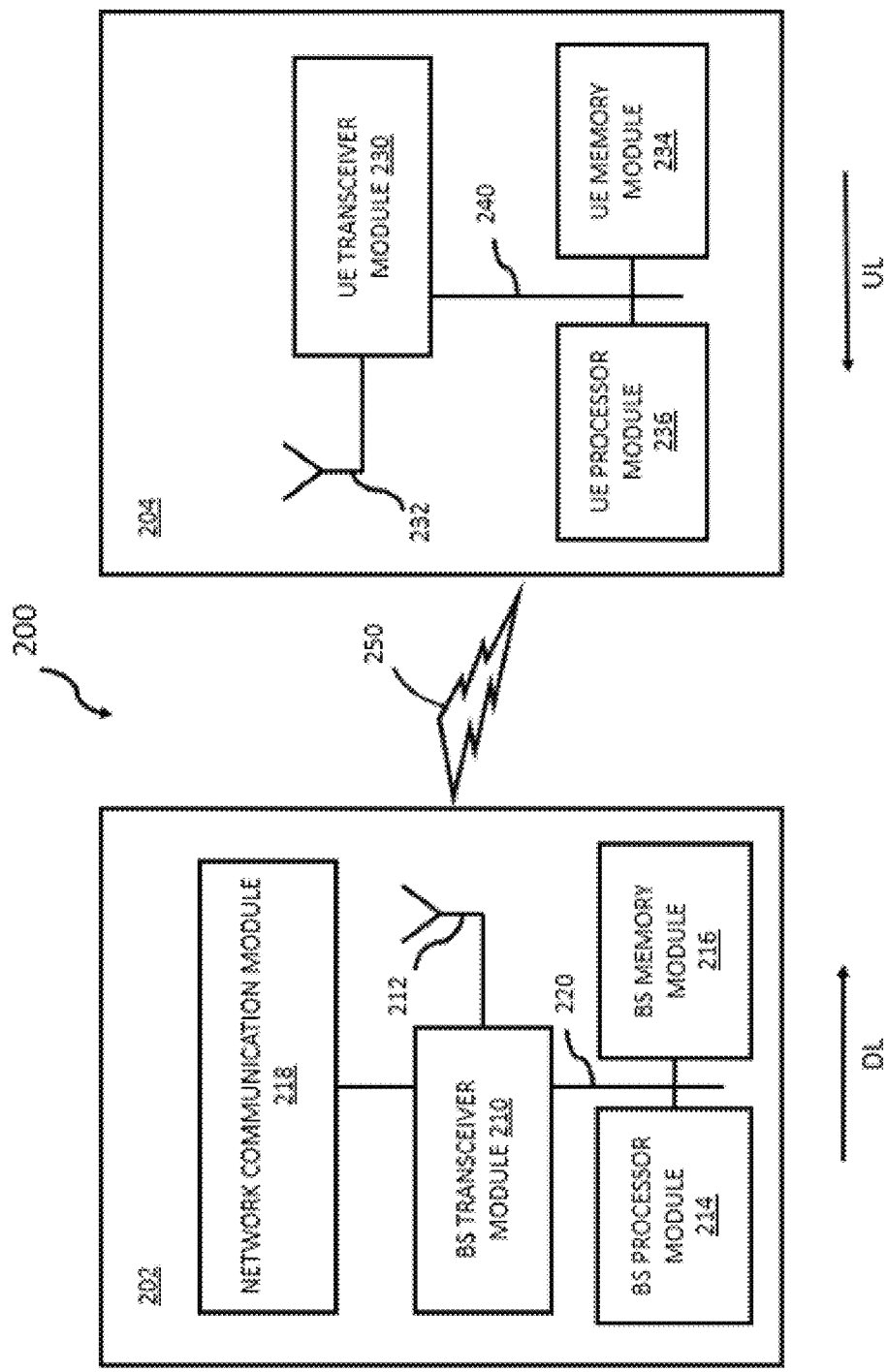
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

2. Systems and Methods for Acquiring Quasi-Co-Location Information (QCL) Using Transmission Configuration Indicators (TCIs)

In a single frequency network (SFN) scenario, the two transmission/reception points (TRPs) may transmit the same information to one user equipment (UE). In the high speed train (HST)-SFN scenarios, the UE may move from one TRP to the other TRP, so the Doppler caused by high speed may be opposite from the two TRPs. Because UE is moving away from TRP0 and forward to TRP1, an opposite frequency offset on the same PDSCH from different TRPs may arise. As a result, the frequency offset from the two TRPs may be compensated.

The two TRPs may transmit the same information to one UE, and the tracking reference signal (TRS) may be configured to estimate a frequency offset (e.g., Doppler shift) caused by the high speed. One TCI state can be configured with one TRS resource or resource set from one TRP. In this manner, if only one TRS is configured for a SFN PDSCH from two TRPs, the difference or opposite frequency offset may not be estimated correctly.

The transmission configuration indicator (TCI) states may be activated by media access control control element (MAC-CE) and indicated by downlink control information (DCI)

identifying parameters, such as Doppler shift and Doppler spread. The TCI states may be configured for the TRS and a physical downlink shared channel (PDSCH). If the quasi-co-location (QCL) information configured in the TCI states can be provided to the UE, how the UE is to use the QCL information contained in the two TCI states configured for two TRPs may be considered.

At least one TRS may be configured for each TRP. The TRS may be used in conjunction with pre-compensation for PDSCH frequency offset compensation in HST-SFN transmission. If pre-compensation is supported in the HST-SFN scenario, the downlink carrier frequency (corresponding to the frequency offset) should may indicated to UE for modulating the uplink reference signal (RS) or PUSCH. When the TRPs receive the uplink SRS, the TRP can obtain the frequency offset for the downlink transmission and use this estimated frequency offset as the pre-compensation frequency offset value. The related Doppler parameters may be indicated to UE by activating or indicating TCI states to UE. Four QCL types may be used to this end:

"QCL-TypeA": {Doppler shift, Doppler spread, average delay, delay spread};
"QCL-TypeB": {Doppler shift, Doppler spread};
"QCL-TypeC": {Doppler shift, average delay}; and
"QCL-TypeD": {Spatial Rx parameter}

The TCI states may be activated by MAC CE and indicated by DCI identifying the parameters such as Doppler shift and Doppler spread. The TCI states can be configured for the TRS and PDSCH. In this manner, the UE can acquire the Doppler related parameters according to the TCI states.

Figure 3:
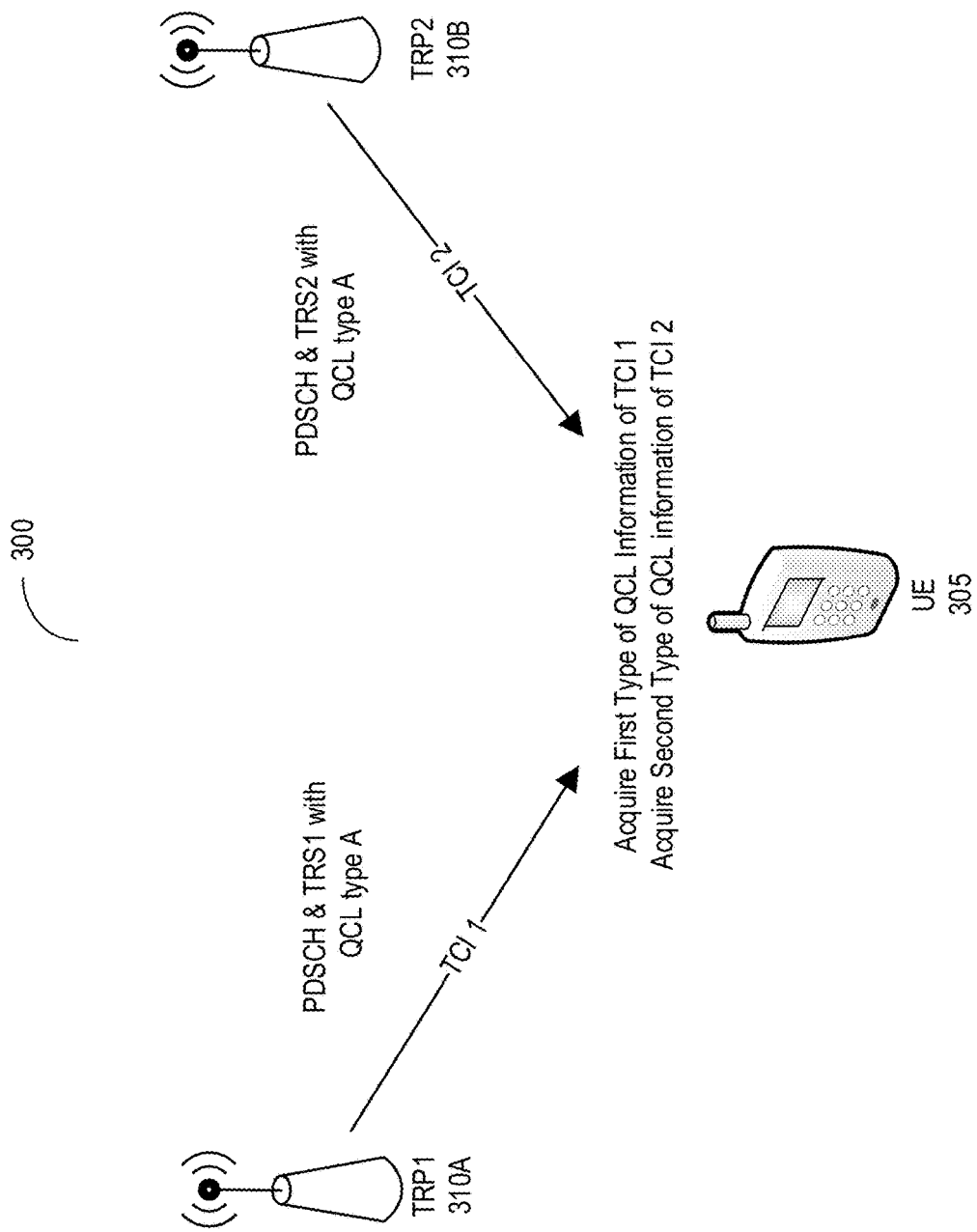
FIG. 3 illustrates a block diagram of a system for quasi-co-location information using transmission configuration indicators in accordance with an illustrative embodiment.

A. Transmission Configuration Indicator (TCI) Codepoint Identifying Multiple TCI States Referring now to FIG. 3, depicted is a block diagram of a system 300 for quasi-co-location information using transmission configuration indicators. The system 300 may include at least one user equipment (UE) 305 (e.g., UE 104) and one or more transmission/reception points (TRPs) 310A and 310B (e.g., BS 102) (also referred herein generally as TRP 310), among others. A TCI codepoint may contain two TCI states activated or indicated to one UE. The UE may receive the two TCI states and acquire the QCL information in one or more techniques. First, the UE may obtain using a first type (or kind) QCL information to acquire all the QCL information of one of the two TCI states. Second, the UE may obtain using a second type (or kind) QCL information to acquire one or some of the QCL information of the other TCI states.

In some embodiments, a MAC CE may activate two TCI states or one TCI codepoint in the DCI indicating the two TCI states. The UE may receive the two TCI states and acquire the QCL information from all the QCL information of one of the two TCI states and ignore one or more QCL information of the other TCI states.

In some embodiments, a MAC CE may activate plurality of transmission configuration indicator (TCI) states. In some embodiments, a DCI may indicate one codepoint that contains two TCI states to the UE. The UE may identify the PDSCH or the downlink reference signal that is transmitted from two TRPs. Also, a higher layer parameter (e.g., radio resource control (RRC) signaling) can configure the transmitting scheme as SFN. If only one demodulation reference signal (DMRS) code division multiplexing (CDM) group is configured, the UE may determine that the transmitting scheme is SFN according to the RRC parameter and the number of activated or indicated TCI states.

In the SFN scheme, the same PDSCH may be transmitted from several TRPs. For example, with two TRPs, two TCI states may be activated or indicated for SFN scheme. The QCL information may be configured in each TCI state. For example, QCL type A, or QCL type B, or QCL type C can be configured for FR1 (a first frequency band), and QCL type D can be configured with one of QCL type A, or QCL type B or QCL type C for FR2 (a second frequency band).

In the high speed scenario (e.g., HST), the UE may move fast from some TRPs to some other TRPs. The frequency offset caused by the high speed may be different or even opposite between these TRPs. Considering that the same PDSCH is transmitted from different TRPs in the high speed scenario, pre-compensation may be used to address the problem of different frequency offset from different TRPs.

If the UE can modulate the uplink reference signal according to the downlink carrier frequency and frequency offset (e.g., Doppler shift), UE may obtain the Doppler shift or Doppler spread from QCL information in the TCI states. This can be configured by higher layer parameter (e.g., RRC signaling). If the frequency offset pre-compensation of PDSCH or downlink reference signal (DL-RS) is configured by RRC signaling, the UE may obtain the Doppler-related information from the related TCI state.

Two TCI states may be activated for SFN transmission. For FR1, the QCL type in the TCI states can be QCL type A or QCL type C. For example, with QCL type A, the QCL related parameters may include {Doppler shift, Doppler spread, average delay, delay spread}. The same QCL type may be configured for the two TRPs. The uplink reference signal may be modulated at the carrier frequency based on the downlink carrier frequency and the frequency offset. The frequency offset related parameter can be obtained from the QCL parameter Doppler shift. But one Doppler shift can be found in each QCL information from each TCI state, and only one Doppler shift can be used as the reference frequency offset parameter or module uplink reference. The Doppler shift from the other TCI states may be ignored. As a result, if two TCI states are activated or indicated to one UE, and the transmission scheme is SFN, all the QCL information from one TCI state may be acquired. In addition, one or more of the QCL information from the other TCI state may be acquired.

Furthermore, the Doppler shift or some more QCL parameters contained in the other TCI states may be not be used as a reference. For example, as depicted, the QCL types of the two TCI states configured for the two TRPs in the SFN scenario may be QCL type A. In such a scenario, all the parameters, (e.g., {Doppler shift, Doppler spread, average delay, delay spread}) may be the reference parameter of the related TCI states for one TCI state, and one or some of these parameters may be ignored by the UE. In the high speed scenario if pre-compensation is used, the Doppler shift may not be considered from the other TCI state (e.g., {Doppler spread, average delay, delay spread}).

Also, the {Doppler shift, Doppler spread} may be ignored, and the UE can acquire the QCL parameters of {average delay, delay spread} from the second set of TCI states. The Two TRPs may be configured with the same TRS resources or different resources. For example, as depicted, different TRS resources may be considered. TRS1 may be transmitted from TRP1 and may be configured with TCI 1. Furthermore, TRS2 is transmitted from TRP2 and is configured with TCI 2. In addition, if QCL type C is configured in the activated or indicated TCI state, the QCL parameters {Doppler shift, average delay} may be contained in the TCI states. As such, {Doppler shift, average delay} from one TCI state may be considered and only {average delay} from the other TCI state may be considered.

The QCL types from different TCI states may be different. For example, QCL type A can be configured in the first TCI states, and QCL type C can be configured in the other TCI state, and the above method is still applicable. In some other scenarios or schemes, one or some of the QCL parameters in the QCL information contained in the TCI states can be ignored, and the above method is still applicable. As a result, one or some of the QCL parameters can be acquired by the UE from the second set of TCI states, obtain the delay related parameters in the QCL information. For example, in some scenarios, one or more these related parameters in the QCL information can be ignored. For the QCL Type A, if the {average delay, delay spread} are ignored, the remaining parameter of {Doppler shift, Doppler spread} can be acquired by the UE from the second set of TCI states.

If QCL type B is configured in the activated or indicated TCI state, the QCL parameters {Doppler shift, Doppler delay} may be contained in the TCI states. According to the above analysis, {Doppler shift} from one TCI state may not be considered and only {Doppler delay} from the other TCI state may be considered. If both the {Doppler shift, Doppler delay} are not used in some scenario, so the QCL type B may not be configured for the second set of TCI states.

The first TCI state of the activated or indicated two TCI states may be default or predefined as both TCI states contains the first type of the QCL information. The second TCI state of the activated or indicated two TCI states may contain the second type of the QCL information. The second TCI state of the activated or indicated two TCI states may be default or predefined as both TCI states contains the first type of the QCL information. The first TCI state of the activated or indicated two TCI states may contain the second type of the QCL information.

In the SFN scheme, if two TCI states are activated or indicated for the PDSCH transmission, according to above description, one TCI states may contain the first kind (or type) of QCL information. For example, in Table 1 below, 8 TCI codepoints may be activated and TCI codepoints 0, 2, 3, 7 containing two TCI states. If these 4 TCI codepoints can be used for SFN scheme, the first TCI state of each TCI codepoint containing 2 TCI states may be identified as containing the first type of QCL information. Furthermore, the second TCI state of each TCI codepoint containing 2TCI states may be identified as containing the second kind (or type) of QCL information. The first kind of QCL information may be all the configured QCL information of the first set of TCI states. The second kind of QCL information may be partial or no portion of the QCL configured information of the second set of TCI states.

TABLE 1 the activated TCI states in MAC CE may be, for example:

| TCI Codepoint | TCI° States |
|---|---|
| 0 | #0 #2 |
| 1 | #3 |
| 2 | #1 #2 |
| 3 | #4 #7 |
| 4 | #5 |
| 5 | #6 |
| 6 | #1 |
| 7 | #0 #4 |

The TCI states contained in the TCI codepoint can be indicated by DCI. As such, one TCI codepoint in Table 1 can be indicated (e.g., codepoint 3). Therefore, the TCI state 4 may be the default TCI that contains the first type of QCL information, and TCI state 7 contains the second type of QCL information. Furthermore, in some scenarios, the offset between the reception of the DL DCI and the corresponding PDSCH may be less than the threshold timeDurationForQCL. The QCL relation of PDSCH corresponding to the lowest codepoint among the TCI codepoints may contain two different TCI states (codepoint 0 in Table 1). The TCI state 0 may be the default TCI that contains the first type of QCL information, and TCI state 2 contains the second type of QCL information.

Considering that QCL type A or QCL type B or QCL type C is supported in FR1 (frequency range 1) and one more QCL type D is supported in FR2, QCL type D can be configured with the QCL type A or QCL type B or QCL type C. Thus, the QCL information in QCL type D may influence (may be independent of) the other QCL types. The two types of QCL information can be supported both in FR1 and FR2.

B. Indication of QCL Information Using DMRS CDM Group Indices

Figure 4:
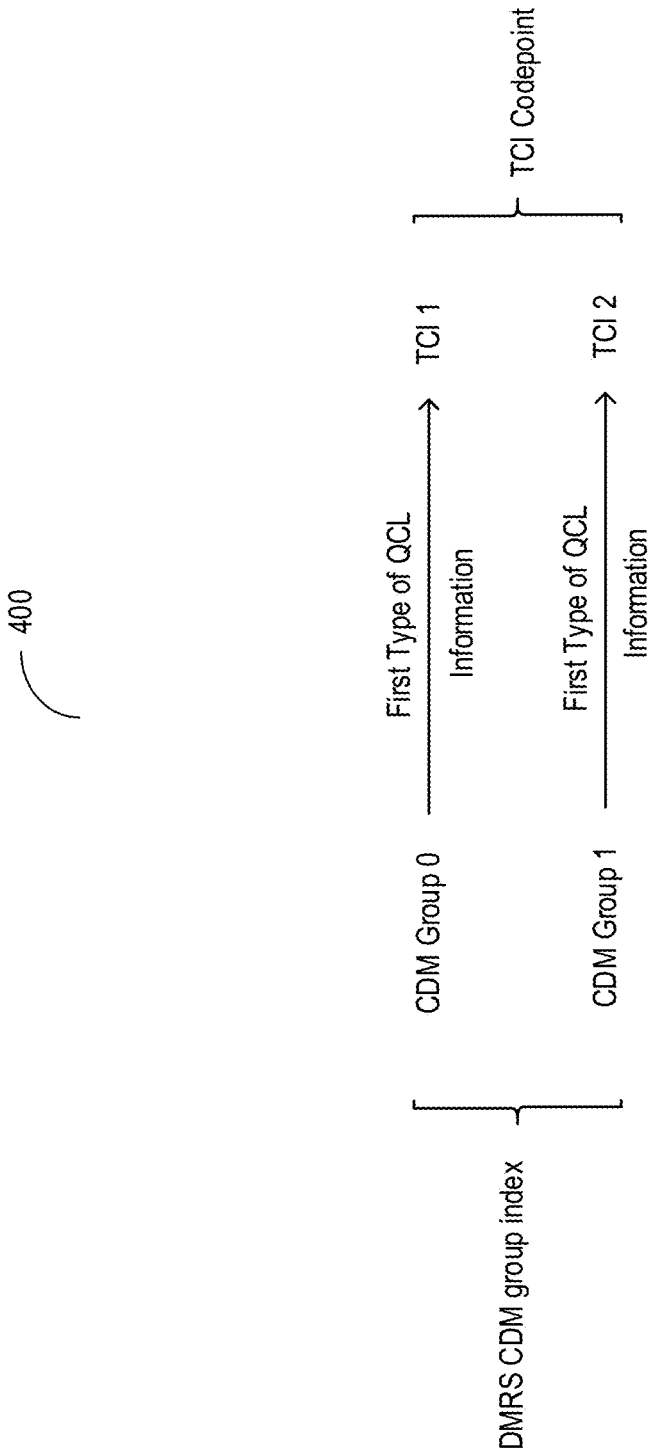
FIG. 4 illustrates a relational diagram of an example configuration for a demodulation reference signal (DMRS) code division multiplexing (CDM) group index in accordance with an illustrative embodiment.

Referring now to FIG. 4, depicted is a relational diagram of a configuration 400 for a demodulation reference signal (DMRS) code division multiplexing (CDM) group index to be used in the system 300. The antenna ports of DMRS or the DMRS CDM group index can be used to indicate the QCL information of the two TCI states.

The antenna port indication in the DCI field may be indicated using DMRS of PDSCH (e.g., as seen in Table 2). As DMRS port 0 and DMRS port 1 may share the same DMRS group (0). Furthermore, DMRS port 2 and DMRS port 3 may share the same DMRS CDM group (1). Thus, when up to two layers (values up to 2) are supported, for a SFN scheme, only one DMRS CDM group may be configured for one UE. For example in Table 2, value 7 and 8 may indicate 2 DMRS ports respectively. The 2 DMRS ports indicated by one (or each) value may be from the same DMRS CDM group ({0.1} is group 0; {2, 3} is group1. Thus, the DMRS CDM group index (value) can be used as the indication of the kind of QCL information to acquire from each TCI state.

TABLE 2

Antenna port(s) (1000 + DMRS port), dmrs-Type = 1, maxLength = 1
One Codeword:
Codeword 0 enabled,
Codeword 1 disabled

| Value | Number of DMRS CDM group(s) without data | DMRS port(s) |
|---|---|---|
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 |
| 10 | 2 | 0-3 |
| 11 | 2 | 0, 2 |
| 12 | 2 | 0, 2, 3, |
| 13-15 | Reserved | Reserved |

For example, in Table 2, the value 7 may indicate that the DMRS ports are port 0 and port 1 of the CDM group 0, and can indicate that the first TCI state contains the first type of QCL information and the second TCI state contains the second type of QCL information. The value 8 may indicate the DMRS ports are port 2 and port 3 of the CDM group 1, and can indicate that the first TCI state contains the second kind of QCL information and the second TCI state contains the first kind of QCL information. If one DMRS port is indicated and that it also can be found the DMRS port is configured for one DMRS CDM group, different DMRS CDM group index also can be used.

If more than one DMRS CDM group is supported for SFN scheme (e.g., found in Table 2 the value 9 to 12), 2 DMRS CDM group may be configured for one UE. Therefore, the use of only the DMRS CDM group index may not distinguish between the two QCL information, and more information may be used. If 3 DMRS ports are indicated in Table as value 9 and value 12, 3 DMRS ports from 2 DMRS CDM groups may be two DMRS ports from one CDM group and one DMRS port from the other CDM group. As such, if two DMRS ports are from DMRS CDM group 0 and the third DMRS port is from DMRS CDM group 1, the first TCI states may contain the first type of QCL information and the second TCI states may contain the second type of QCL information. UE can acquire all configured QCL information (e.g., the first kind of QCL information) from the first indicated TCI state, and acquire partial of configured QCL information (e.g., the second kind of QCL information) from the second indicated TCI state.

If two DMRS ports are from DMRS CDM group 1 and the third DMRS port is from DMRS CDM group 0, the first TCI states may contain the second kind of QCL information and the second TCI states may contain the first kind of QCL information. If 4 DMRS ports are configured for one UE, the DMRS ports of CDM group 0 may be all used. The first TCI state may contain the first kind of QCL information and the second TCI states may contain the second kind of QCL information. For value 11, only one DMRS port of DMRS CDM group 0 is used. The first TCI state may contain the second kind of QCL information and the second TCI states may contain the first kind of QCL information.

The antenna ports of DMRS can be used to indicate that which TCI state(s) are used as the first set of TCI states that contains all configured QCL information and which TCI state(s) are used as the second set of TCI states that contains partial portion configured QCL information. This may be because the antenna ports of DMRS indicate which DMRS port(s) are configured to UE and the configured DMRS port(s) can be used to indicated the set of TCI states. For example, the value 2 in table 2 may indicate that the configured DMRS ports are {0, 1}. The value may indicate that the first TCI states is the first set of TCI states containing all configured QCL information. Furthermore, the value may indicate that the second TCI states is the second set of TCI states containing partial configured QCL information. The value 8 in table 2 may indicate that the configured DMRS ports are {2, 2}. The value may indicate that the second TCI states is the first set of TCI states containing all configured QCL information, and the first TCI states is the second set of TCI states containing partial configured QCL information.

C. High Speed Train Scenario

Figure 5:
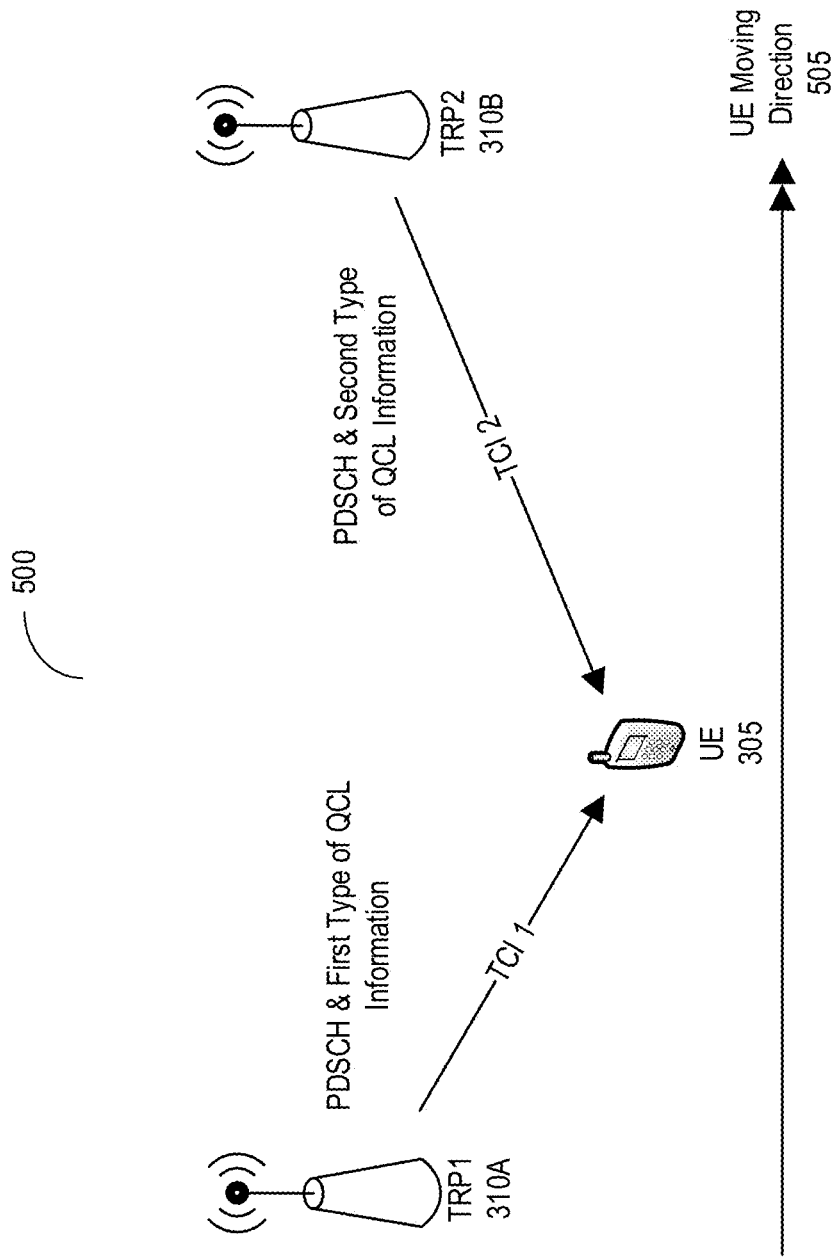
FIG. 5 illustrates a block diagram of an example environment of the system for quasi-co-location information using transmission configuration indicators with a moving user equipment (UE) in accordance with an illustrative embodiment.

Referring now to FIG. 5, depicted is a block diagram of an environment 500 of the system 300 for quasi-co-location information using transmission configuration indicators with a moving user equipment (UE) 305 in a direction 505. The QCL information can be indicated by the UE location. In the high speed train single frequency net scenario as depicted, the train may travel from one TRP (e.g., TRP 310A) to another TRP (e.g., TRP 310B), and there may be a few obstructions (e.g., buildings) blocking the signals from the TRP to the train with the UE (e.g., UE 305). Therefore, the receiving power of the PDSCH or the downlink RS may have some relation with the distance of the signal transmitted. The power loss may be smaller with the short distance than that with the long distance. In many situations, the two TRPs may transmit the PDSCH and the downlink RS with the same or similar power. The UE can receive PDSCH or downlink RS with the smaller power loss, because UE is near one TRP and far away from the other TRP. The higher receiving power with the same noise may always correspond to the better performance of demodulation for one UE. If UE is close to one TRP, the UE can have the better receiving power and make the better performance to estimate the frequency offset.

Two sets of QCL information may be contained in the activated or indicated two TCI stated for the two TRPs. One set of QCL information may be treated as the first type QCL and used to indicate the Doppler related parameters. In this manner, the TCI states of the closer TRP from the UE may contain the first kind of QCL information, because the first kind of QCL information may give the more accurate frequency offset estimation. The Doppler related parameter (e.g., {Doppler shift}) may be ignored from the farther TRP, and the second kind of QCL information may be contained in the TCI configured for this TRP. The TRPs may be settled along with the railway (e.g., along the direction 505). The location of the UE can be identified by the TRP, also can be known by the UE because of the different receiving power of the downlink RS of the two TCI states configured for the two TRPs. The UE location can indicate the using of QCL information of the two TCI states. For one UE location, the TCI state of the first TRP may contain the first type of QCL information. The TCI state of the second TRP may contain the second type of QCL information. When the UE is in the middle of the two TRPs, the TCI states of the coming or approaching TRP may contain the first type of QCL information.

D. Multiple Sets of Transmission/Reception Points (TRPs)

Figure 6:
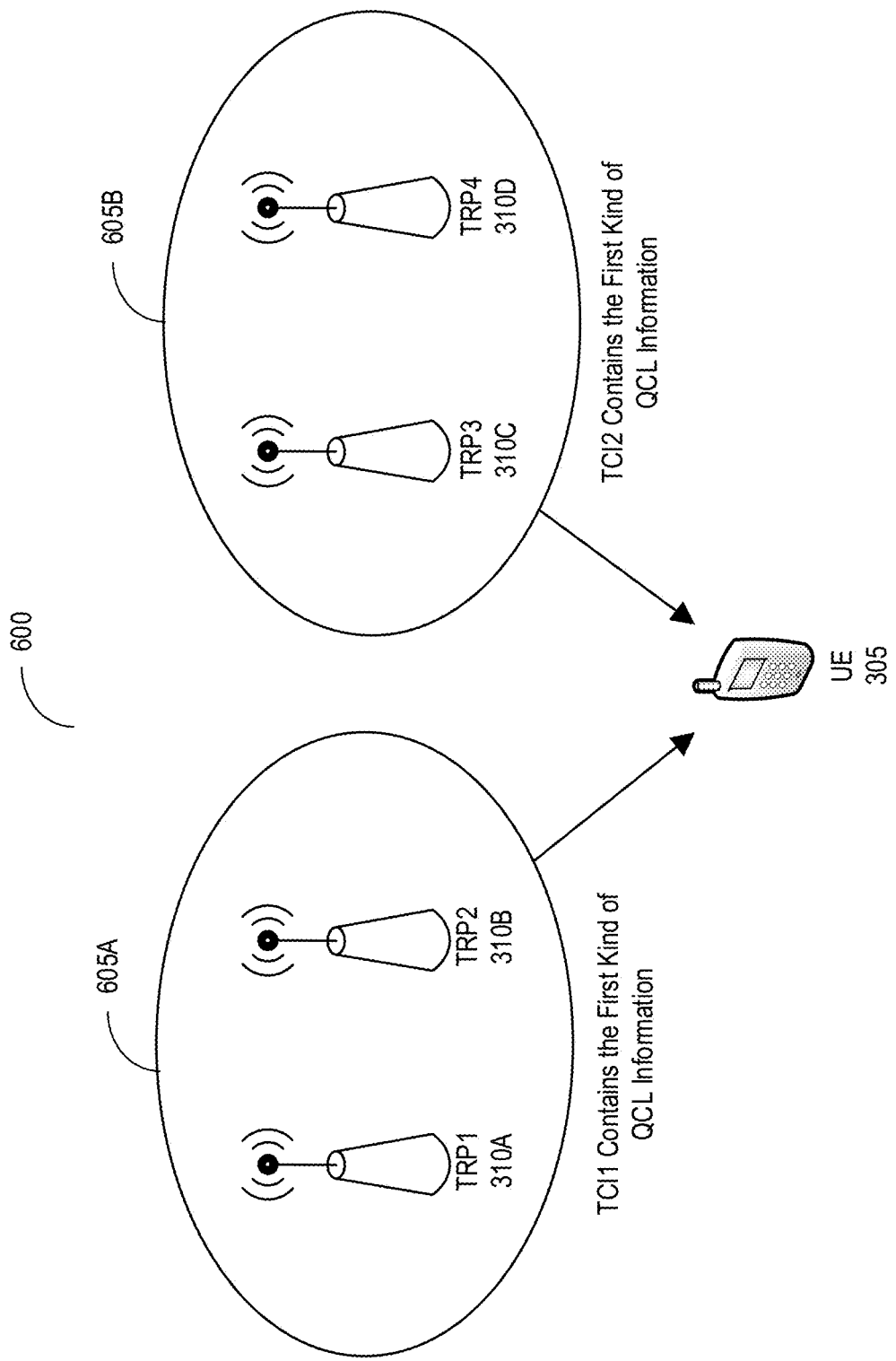
FIG. 6 illustrates a block diagram of an example environment of the system for quasi-co-location information using transmission configuration indicators with multiple sets of transmission/reception points (TRPs) in accordance with an illustrative embodiment.

Referring now to FIG. 6, depicted a block diagram of an environment 600 of the 500 system for quasi-co-location information using transmission configuration indicators with multiple sets 605A and 605B of transmission/reception points (TRPs) 310A-D. For example, as depicted, four TRPs 310A-D may be transmitting the SFN PDSCH to one UE, and 4 TRS resources or TRS resource sets are configured.

If one TCI state is configured for one TRS, 4 TCI states may be indicated or activated for one UE, and one QCL information is contained in each TCI state. As such, one TCI codepoint may be able to contain more TCI states as shown in Table 3 below. The codepoint 0 and codepoint 4 may indicate 4 TCI states respectively. One TCI state may contain the first type of QCL information, and the other TCI states may contain the second type of TCI states. With several TCI states indicated to the UE, more than one TCI states may include the first type of QCL information and the other TCI states may contain the second type of TCI states. As such, the UE may acquire all the QCL information from the first set of TCI states, including one or more TCI states from the indication. The UE mays also acquire partial portion of QCL information from the second set of TCI states include the other TCI states from the indication.

| TCI° codepoint | TCI° states |
|---|---|
| 0 | #0° #2 #3 #6 |
| 1 | #3 |
| 2 | #1° #2 |

-continued

| TCI° codepoint | TCI° states |
| --- | --- |
| 3 | #4° #7 |
| 4 | #3 #5 #6 #7 |
| 5 | #6 |
| 6 | #1 |
| 7 | #0° #4 |

With one codepoint containing one or two TCI states (e.g., as defined in release 16), if more than 2 TRS is configured, TRS resources or resource sets from some TRPs can be configured with the same time domain and frequency domain resources and the same sequence. Thus, one TCI codepoint may contain 2 TCI states, and one TCI state may be associated with several TRS resources and may contain the first kind of QCL information. The other TCI states may be associated with several other TRS resources and may contain the second kind of QCL information as shown.

One TCI states is configured for one TRS resource or resource set, and the PDSCH or the DL RS from several TRPs is indicated by one TCI states, that means one TRS is configured from different TRPs and indicated as the first set of TCI state. And one other TRS is configured for other TRPs and indicated as the second set of TCI state.

Figure 7:
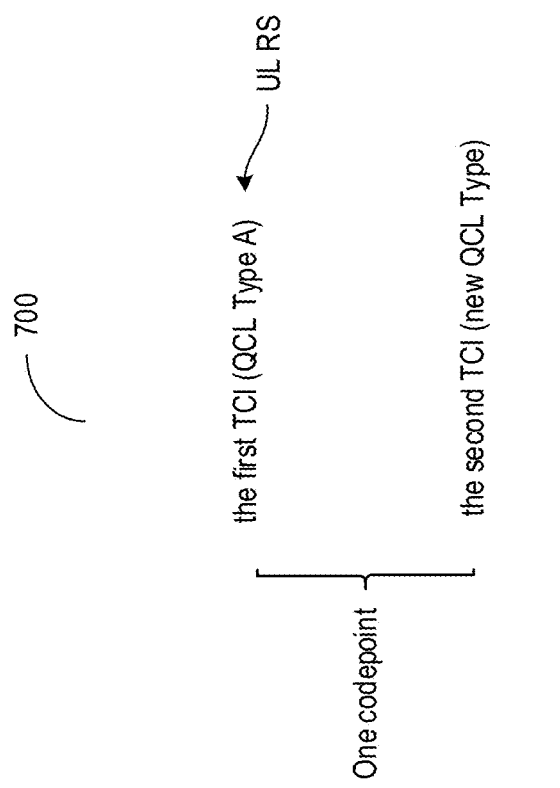
FIG. 7 illustrates a relational diagram of an example configuration of transmission configuration indicators (TCI) with a codepoint with a single quasi-co-location (QCL) type in accordance with an illustrative embodiment.
Figure 8:
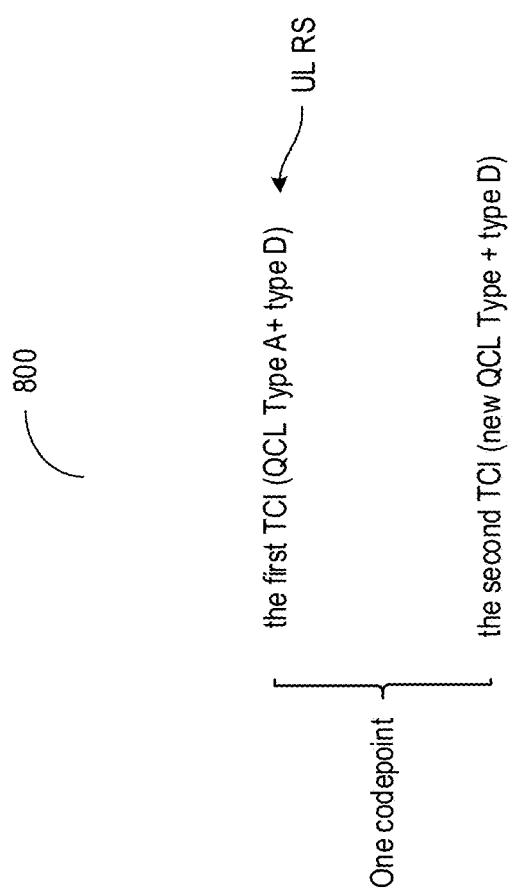
FIG. 8 illustrates a relational diagram of an example configuration of transmission configuration indicators (TCI) with a codepoint with multiple quasi-co-location (QCL) types, in accordance with an illustrative embodiment.

E. Configuring Transmission Configuration Indicators (TCIs) with a Quasi-Co-Location (QCL) Type Referring now to FIG. 7, depicted is a relational diagram of an configuration 700 of transmission configuration indicators (TCI) with a codepoint with a single quasi-co-location (QCL) type. Referring also to FIG. 8, depicted is a relational diagram of a configuration 800 of transmission configuration indicators (TCI) with a codepoint with multiple quasi-co-location (QCL) types. If the second QCL information is defined to a new QCL type in the HST-SFN scenario, the {Doppler shift} may not be contained in the QCL information. As such, the new QCL type may be configured for the HST-SFN scenario. The new QCL type may be configured mainly for pre-compensation in the HST-SFN scenario. The other schemes (e.g., as defined in release 16 and release 15) may not rely on this new QCL type. Once the new QCL type is configured, the UE may identify that the scheme is HST-SFN and the pre-compensation is used. The configuration of a new QCL type may indicate the configuration of a new HST-SFN and pre-compensation One codepoint may contain 2 TCI states configured for 2 TRPs. QCL type A or type C can be configured in one TCI state and the new TCI state may be configured for the other TCI state. In pre-compensation, the uplink RS may indicate which TCI state may be associated to acquire the QCL information. With the Doppler shift or the Doppler spread or both of the two parameters not contained in the new QCL type, the TCI that contains the QCL type A or QCL type C may be associated with the uplink RS (e.g., as depicted).

In the PDSCH transmission, QCL type A or QCL type C can be configured in the TCI states configuration. As such, different QCL information may be configured for different scenarios. For HST-SFN scheme, if QCL type A is configured, the parameter {Doppler shift, Doppler spread, average delay, delay spread} may be contained. If the new QCL type is supported in this scenario, the Doppler shift may not be contained in the new QCL type. As such, the new QCL type may contain the QCL information {Doppler spread, average delay, delay spread}. If QCL type C is configured in this scenario, the QCL information may include {Doppler shift, average delay}, and the new QCL type can be configured as {average delay}. In FR2, the QCL type D in the TCI state may be configured to indicate the Rx spatial relation, the new QCL type and QCL type D may be configured in one TCI state.

F. Sending Uplink Reference Signals (RS)

The uplink reference signal (RS) can be indicated or configured to be associated with one downlink RS (e.g., TRS). If the uplink RS is indicated or configured with one TRS resource or resource set, the UE may acquire the QCL information from the TCI state of TRS resource to be used as the reference to module the UL RS in the HST-SFN scheme. The Doppler related parameters in the QCL information of the TCI states configured or indicated to one TRS resource may be identified as to be used as the reference information to module the UL RS. Thus, the TCI states configured or indicated for plurality of TRS resource(s) which are associated with the UL RS may be the first set of TCI states. Furthermore, the other TCI states configured or indicated for other TRS resource(s) may be the second set of TCI states. Similar to the PDSCH, the MAC CE can activate or the DCI can indicate the TCI states for the PDCCH, and thus only partial configured QCL information of the second indicated set of TCI states may be acquired by the UE.

Figure 9:
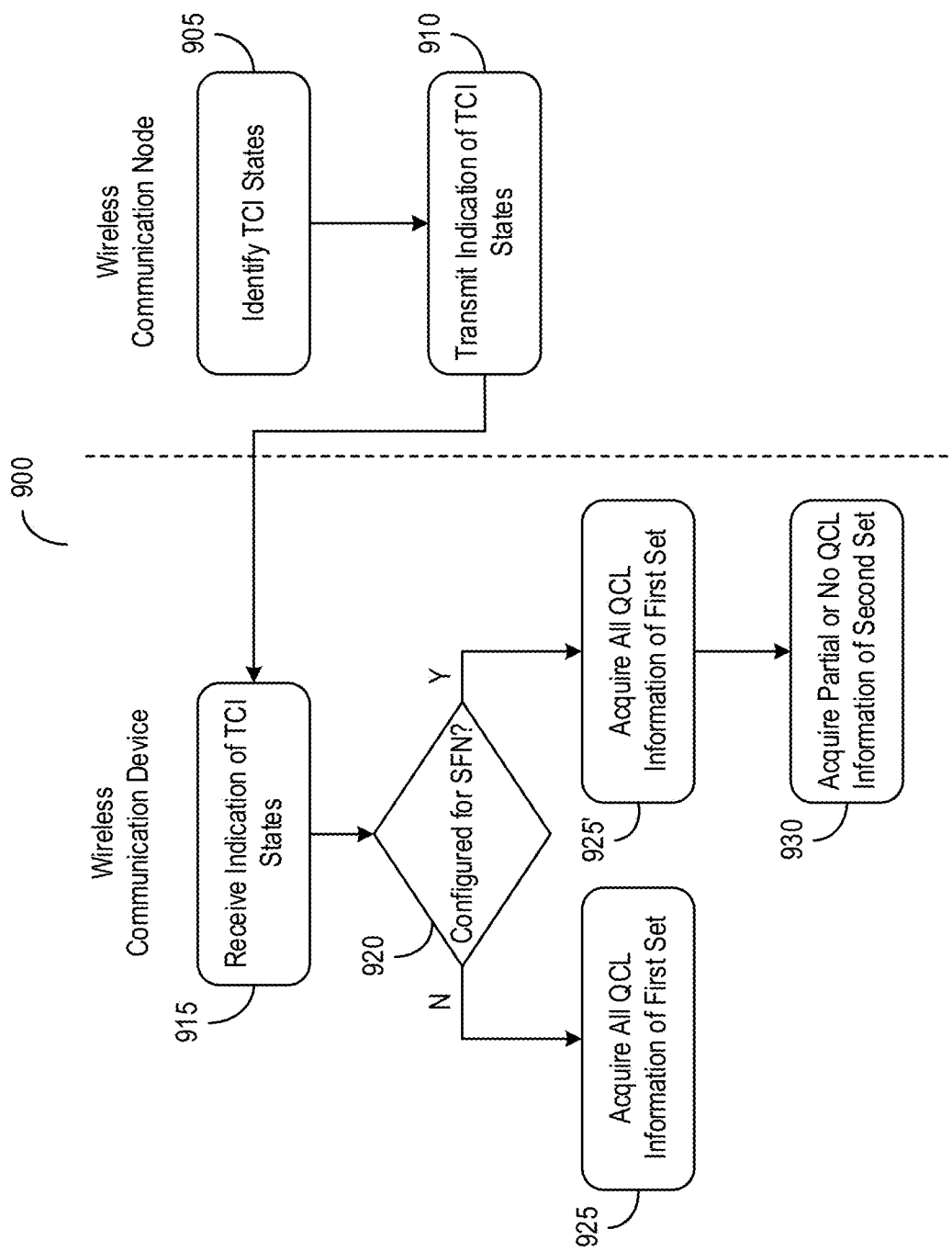
FIG. 9 illustrates a flow diagram of a method for quasi-co-location information using transmission configuration indicators in accordance with an illustrative embodiment.

G. Process for Quasi-Co-Location Information Using Transmission Configuration Indicators Referring now to FIG. 9, depicted is a flow diagram of a method 900 for quasi-co-location information using transmission configuration indicators. The method 900 may be implemented using or performed by one or more components detailed herein, such as BS 102, UE 104, UE 310, or TRP 310. In brief overview, a wireless communication node may identify transmission configuration indicator (TCI) states (905). The wireless communication node may transmit an indication of the TCI states (910). A wireless communication device may receive the indication of the TCI states (915). The wireless communication device may determine whether a transmission scheme is configured for a single frequency network (SFN) (920). The wireless communication device may acquire all configured quasi co-located (QCL) information of a first set of TCI states (925 and 925'). When the transmission scheme is for SFN, the wireless communication device may acquire partial portion or no portion of the QCL information of the second set of TCI states (930).

In further detail, a wireless communication node (e.g., the BS 104 or TRP 310) may determine or identify transmission configuration indicator (TCI) states (905). The TCI states may be triggered, initiated, or otherwise activated for a particular wireless communication device (e.g., the UE 102). For example, the TCI states may be activated via a media access control, control element (MAC-CE) or downlink control information (DCI). In some embodiments, the wireless communication node may identify multiple sets of TCI states for the wireless communication node. Each of the TCI states may be configured with a tracking reference signal (TRS) resource to permit estimation of a frequency offset arising from a motion of the wireless communication device relative to the wireless communication device in the environment.

Furthermore, each TCI state may indicate quasi-co-location (QCL) information for the wireless communication device. The QCL information may define correlation among data (e.g., in the form of symbols) communicated from different antenna ports. The QCL information may include one or more types of QCL. Each type of QCL may include one or more parameters. For example, QCL Type A may include {Doppler shift, Doppler spread, average delay, delay spread}, QCL Type B may include {Doppler shift, Doppler spread}, QCL Type C may include {Doppler shift, average delay}, and QCL Type D may include {Spatial Rx parameter}.

The wireless communication node may send, provide, or otherwise transmit an indication of the TCI states to a wireless communication device (e.g., the UE 102 or 305) (910). With the activation of the TCI states for the wireless communication device, the indication of the TCI states may be transmitted by the wireless communication node. The indication may define, correspond to, or identify the TCI states and the QCL information of each TCI state identified for the wireless communication node. In some embodiments, the wireless communication node may provide the indication of the TCI states via MAC-CE, DCI, or one or more TCI code points. In some embodiments, the wireless communication node may transmit an indication whether a transmission scheme is for a single frequency network (SFN) to the wireless communication device via a higher layer signaling (e.g., radio resource control (RRC) signaling). When the indication specifies SFN, the indication may further identify or define that, in the SFN, only a partial portion of the configured QCL information of another set of TCI states is to be acquired. On the other hand, when the indication does not specify SFN, the indication may further identify or define that at least a portion of the configured QCL information of the set of TCI states is to be acquired.

The wireless communication device may retrieve, identify, or otherwise receive the indication of the TCI states from at least one wireless communication node (915). In some embodiments, the wireless communication device may receive the indication of the TCI states from multiple wireless communications nodes (e.g., TRPs 310). In some embodiments, the wireless communication device may receive the indication of TCI state via MAC-CE, DCI, or one or more TCI code points from each wireless communication node. In some embodiments, the wireless communicate node may receive the indication that the transmission scheme is for the SFN from the wireless communication node via the higher layer signaling. The indication may further identify or define that, in the SFN, only a partial portion of the configured QCL information of at least one set of state is to be acquired by the wireless communicate device. Conversely, when the indication does not specify SFN, the indication may further identify or define that at least a portion of the configured QCL information of the set of TCI states is to be acquired.

The wireless communication device may determine whether a transmission scheme is configured for SFN (920). Based on the indication received from the wireless communication node, the wireless communication device may identify or determine the transmission scheme. If the indication specifies that the transmission scheme is to be SFN, the wireless communication device may determine that the transmission scheme is configured for SFN. Conversely, if the indication specifies that the transmission scheme is not to be SFN, the wireless communication device may determine that the transmission scheme is not configured for SFN. In some embodiments, the wireless communication device may determine that the transmission scheme is not configured for SFN when the indication is not received (e.g., by default).

The wireless communication device may acquire all configured quasi co-located (QCL) information of a first set of TCI states (925 and 925'). The QCL information of the first set of TCI states may be from a plurality of TCI states. The first set of TCI states may correspond to or include at least one first TCI state. The information in all the configured QCL information may depend on the QCL-type specified for the first TCI state. For example, as discussed above, QCL Type A may include {Doppler shift, Doppler spread, average delay, delay spread}, QCL Type B may include {Doppler shift, Doppler spread}, QCL Type C may include {Doppler shift, average delay}, and QCL Type D may include {Spatial Rx parameter}. The wireless communication device may initially identify all the parameters included in the configured QCL information as defined in the QCL-type.

In some embodiments, the wireless communication device may determine to acquire all the configured QCL information from the first set of TCI states. In some embodiments, the determination may be in accordance to with a location of the wireless communication device. The location of the wireless communication may be defined relative to the wireless communication node. In some embodiments, the determination to acquire all the configured QCL information may be in accordance with an antenna port indication of a demodulation reference signal (DMRS). The antenna port indication may be identified in the DCI field using DMRS of a physical downlink shared channel (PDSCH) received from the corresponding wireless communication device. In some embodiments, the determination to acquire all the configured QCL information may be in accordance with a DMRS code division multiplexing (CDM) group index. The DMRS CDM group index may identify at least one value for a CDM group corresponding to the first set of TCI states.

When the transmission scheme is for SFN, the wireless communication device may acquire a partial portion or no portion of configured QCL information of a second set of TCI states (930). The QCL information of the second set of TCI states may be from a plurality of TCI states. The second set of TCI states may correspond to or include at least one second TCI state. The information in all the configured QCL information may depend on the QCL-type specified for the second TCI state. In some embodiments, the QCL type in the second set of TCI states may include QCL type A or QCL type C for a first frequency range (FR1).

In some embodiments, the wireless communication device may acquire the partial portion of the QCL information of the second set of TCI states. In acquiring the partial portion of the configured QCL information of the second set of TCI states, the wireless communication device may remove one or more parameters from all the QCL parameters in each TCI state of the second set of TCI states. With the removal, the wireless communication node may use or identify one or more remaining QCL parameters as the partial portion of the configured QCL information. In some embodiments, the partial portion may include or identify remaining QCL parameter after removing {Doppler Shift} from all configured QCL parameters in each TCI state of the second set of TCI states. In some embodiments, the partial portion may include or identify remaining QCL parameter after removing {Doppler Shift, Doppler Spread} from all configured QCL parameters in each TCI state of the second set of TCI states.

In some embodiments, the wireless communication device may acquire the partial portion of the configured QCL information from the second set of TCI states based on the QCL-type defined for the corresponding TCI states in the second set. In some embodiments, for QCL Type A information included in each TCI state of the second set of TCI states, the partial portion may identify or include {Doppler Spread, Average Delay, Delay Spread}. In some embodiments, for QCL Type A information included in each TCI state of the second set of TCI states, the partial portion may identify or include {Average Delay, Delay Spread}. In some embodiments, for QCL Type C information included in each TCI state of the second set of TCI states, the partial portion may identify or include {Average Delay}. In some embodiments, for QCL Type B information included in each TCI state of the second set of TCI states, the partial portion may identify or include {Doppler Spread}.

In some embodiments, the wireless communication device may determine to acquire the partial portion of the configured QCL information from the second set of TCI states. In some embodiments, the determination may be in accordance to with a location of the wireless communication device. The location of the wireless communication may be defined relative to the wireless communication node. In some embodiments, the determination to acquire the partial portion of the configured QCL information may be in accordance with an antenna port indication of a demodulation reference signal (DMRS). The antenna port indication may be identified in the DCI field using DMRS of a physical downlink shared channel (PDSCH) received from the corresponding wireless communication device. In some embodiments, the determination to acquire the partial portion of the configured QCL information may be in accordance with a DMRS code division multiplexing (CDM) group index. The DMRS CDM group index may identify at least one value for a CDM group corresponding to the first set of TCI states.

In some embodiments, the wireless communication device may acquire no portion of the QCL information of the second set of TCI states. Based on the determination that the transmission scheme is for SFN, the wireless communication device may determine that the partial portion of the configured QCL parameters of each state in the second set of TCI states is not to be used as a reference. In some embodiments, the wireless communication device may use all the QCL information acquired from the first set of TCI states in response to the determination.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

The invention claimed is:

1. A method, comprising:
receiving, by a wireless communication device, an indication of a plurality of transmission configuration indicator (TCI) states, from a wireless communication node;
acquiring, by the wireless communication device, all configured quasi co-located (QCL) information of a first set of TCI states from the plurality of TCI states; and
acquiring, by the wireless communication device, a partial portion of configured QCL information of a second set of TCI states from the plurality of TCI states, when a transmission scheme is configured for single frequency network (SFN),
wherein the partial portion comprises one or more remaining QCL parameters after removing {Doppler Shift, Doppler Spread} from all configured QCL parameters in each TCI state of the second set of TCI states.

2. The method of claim 1, wherein, for QCL Type A information included in each TCI state of the second set of TCI states, the partial portion includes {Average Delay, Delay Spread}.

3. The method of claim 1, comprising:
determining, by the wireless communication device, that a partial portion of configured QCL parameters of each TCI state of the second set of TCI states is not to be used as a reference, when the transmission scheme is configured for SFN.

4. A method, comprising:
transmitting, by a wireless communication node, an indication of a plurality of transmission configuration indicator (TCI) states to a wireless communication device;
causing the wireless communication device to acquire all configured quasi co-located (QCL) information of a first set of TCI states from the plurality of TCI states, and to acquire a partial portion or no portion of configured QCL information of a second set of TCI states from the plurality of TCI states, when a transmission scheme is configured for single frequency network (SFN),
wherein the partial portion comprises one or more remaining QCL parameters after removing {Doppler Shift, Doppler Spread} from all configured QCL parameters in each TCI state of the second set of TCI states.

5. The method of claim 4, wherein, for QCL Type A information included in each TCI state of the second set of TCI states, the partial portion includes {Average Delay, Delay Spread}.

6. The method of claim 4, comprising:
causing, by the wireless communication node, the wireless communication device to determine that a partial portion of configured QCL parameters of each TCI state of the second set of TCI states is not to be used as a reference, when the transmission scheme is configured for SFN.

7. A wireless communication device, comprising:
at least one processor configured to:
receive, via a receiver, an indication of a plurality of transmission configuration indicator (TCI) states, from a wireless communication node;
acquire all configured quasi co-located (QCL) information of a first set of TCI states from the plurality of TCI states; and
acquire a partial portion of configured QCL information of a second set of TCI states from the plurality of TCI states, when a transmission scheme is configured for single frequency network (SFN),
wherein the partial portion comprises one or more remaining QCL parameters after removing {Doppler Shift, Doppler Spread} from all configured QCL parameters in each TCI state of the second set of TCI states.

8. The wireless communication device of claim 7, wherein, for QCL Type A information included in each TCI state of the second set of TCI states, the partial portion includes {Average Delay, Delay Spread}.

9. The wireless communication device of claim 7, wherein the at least one processor is further configured to:
determine that a partial portion of configured QCL parameters of each TCI state of the second set of TCI states is not to be used as a reference, when the transmission scheme is configured for SFM.

10. A wireless communication node, comprising:
at least one processor configured to:
transmit, via a transmitter, an indication of a plurality of transmission configuration indicator (TCI) states to a wireless communication device,
cause the wireless communication device to acquire all configured quasi co-located (QCL) information of a first set of TCI states from the plurality of TCI states, and to acquire a partial portion or no portion of configured QCL information of a second set of TCI states from the plurality of TCI states, when a transmission scheme is configured for single frequency network (SFN),
wherein the partial portion comprises one or more remaining QCL parameters after removing {Doppler Shift, Doppler Spread} from all configured QCL parameters in each TCI state of the second set of TCI states.

11. The wireless communication node of claim 10, wherein, for QCL Type A information included in each TCI state of the second set of TCI states, the partial portion includes {Average Delay, Delay Spread}.

12. The wireless communication node of claim 10, wherein the wireless communication device determines that a partial portion of configured QCL parameters of each TCI state of the second set of TCI states is not to be used as a reference, when the transmission scheme is configured for SFN.

* * * * *